(12) United States Patent
Omanovic et al.

(10) Patent No.: US 11,772,467 B2
(45) Date of Patent: Oct. 3, 2023

(54) RAIN RESISTANT SYSTEM

(71) Applicant: Panasonic Automotive Systems Company of America, Division of Panasonic Corporation of North America, Peachtree City, GA (US)

(72) Inventors: Edo Omanovic, Livonia, MI (US); Katherine Freund, Livonia, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 17/696,505

(22) Filed: Mar. 16, 2022

(65) Prior Publication Data

US 2022/0379695 A1    Dec. 1, 2022

Related U.S. Application Data

(60) Provisional application No. 63/195,224, filed on Jun. 1, 2021.

(51) Int. Cl.
*B60J 7/057*    (2006.01)
*E05F 15/71*    (2015.01)
*B60J 7/12*    (2006.01)

(52) U.S. Cl.
CPC .......... *B60J 7/0573* (2013.01); *B60J 7/1269* (2013.01); *E05F 15/71* (2015.01)

(58) Field of Classification Search
CPC .......... B60J 7/057; B60J 7/1269; E05F 15/71; E05Y 2900/508
USPC ..................... 296/223, 107.01, 117
See application file for complete search history.

(56) References Cited

U.S. PATENT DOCUMENTS 6,748,308 B2 *  6/2004  Losey .................. E05F 15/689
454/75

FOREIGN PATENT DOCUMENTS

JP    2005001452 A  *  1/2005
JP    4261217 B2   *  4/2009

OTHER PUBLICATIONS

Text JP4261217. (Year: 2009).*
Text JP20051452 (Year: 2001).*

* cited by examiner

*Primary Examiner* — Dennis H Pedder
(74) *Attorney, Agent, or Firm* — Laurence S. Roach, Esq.

(57) ABSTRACT

A motor vehicle includes a precipitation sensor detecting weather-related precipitation. An actuator moves a movable overhead covering between a covered position and an uncovered position. An electronic processor is communicatively coupled to the precipitation sensor and to the actuator. The electronic processor responds to the precipitation sensor detecting weather-related precipitation by automatically causing the actuator to move the movable overhead covering from the uncovered position to the covered position.

7 Claims, 3 Drawing Sheets

RAIN RESISTANT SYSTEM

CROSS-REFERENCED TO RELATED APPLICATIONS

This application claims benefit of U.S. Provisional Application No. 63/195,224, filed on Jun. 1, 2021, the disclosure of which is hereby incorporated by reference in its entirety for all purposes.

BACKGROUND OF THE INVENTION

1. Field of the Invention

The present invention relates to a roof system for a convertible motor vehicle.

2. Description of the Related Art

If a driver with a convertible vehicle leaves the roof down and a rain shower occurs, then the passenger compartment of the vehicle as well as all of the items inside become soaked. Currently, rain sensors are used exclusively for rain wiper speed. There is no autonomous way to cover a convertible vehicle. The driver must manually move the roof up before leaving the vehicle. If the driver is not around during a rain shower, the interior of the vehicle can be damaged by the rain.

SUMMARY OF THE INVENTION

The present invention provides a rain resistant convertible motor vehicle that utilizes the already existing in-vehicle rain sensor and possibly other sensors. The rain sensor may be polled occasionally in a convertible vehicle while the roof is down to check for a possible rain condition. If the sensors find that both the roof is set to the down position and there is an active rain condition, the vehicle may be automatically covered by moving the roof to the up position.

The invention comprises, in one form thereof, a motor vehicle including a motor vehicle having a precipitation sensor detecting weather-related precipitation. An actuator moves a movable overhead covering between a covered position and an uncovered position. An electronic processor is communicatively coupled to the precipitation sensor and to the actuator. The electronic processor responds to the precipitation sensor detecting weather-related precipitation by automatically causing the actuator to move the movable overhead covering from the uncovered position to the covered position.

The invention comprises, in another form thereof, a method of operating a movable overhead covering of a motor vehicle, including detecting weather-related precipitation, and, in response to the detecting of the weather-related precipitation, automatically moving the moveable overhead covering from an uncovered position to a covered position.

The invention comprises, in yet another form thereof, a motor vehicle including a precipitation sensor detecting weather-related precipitation. An actuator moves a movable overhead covering from an uncovered position to a covered position. An electronic processor is communicatively coupled to the precipitation sensor and to the actuator. The electronic processor responds to the precipitation sensor detecting weather-related precipitation by automatically causing the actuator to move the movable overhead covering from the uncovered position to the covered position. The detecting of weather-related precipitation and the moving of the movable overhead covering are performed while driver-controllable electronic accessories of the vehicle are disabled, and without any human being in the motor vehicle.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
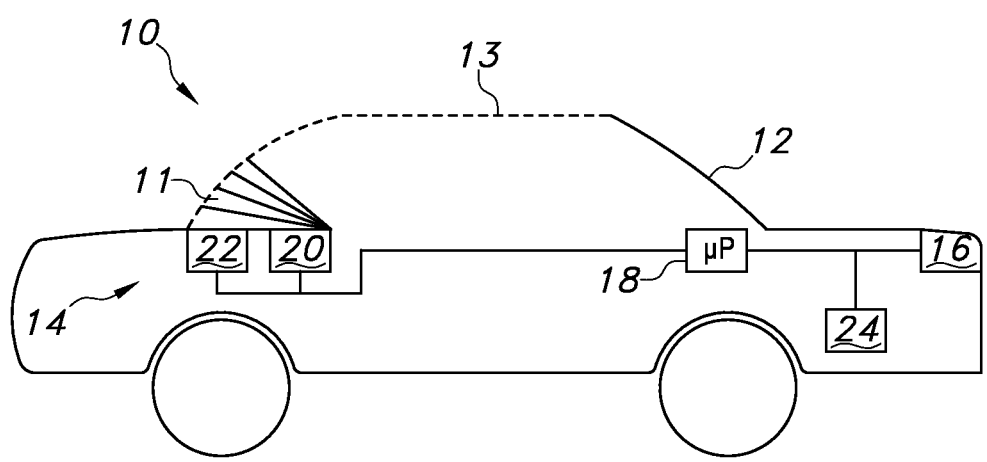
FIG. 1 is a schematic diagram of one embodiment of a motor vehicle including a convertible roof control arrangement of the present invention.

FIG. 1 illustrates one embodiment of a motor vehicle 10 including a convertible roof 11, front windshield 12 and a convertible roof control arrangement 14 of the present invention. Roof 11 is shown in its down position. The up position of roof 11 is indicated at 13 in dashed lines. Arrangement 14 includes a rain sensor 16, an electronic processor 18, a roof position sensor 20, a roof actuator 22, and a vehicle ignition 24.

Figure 2:
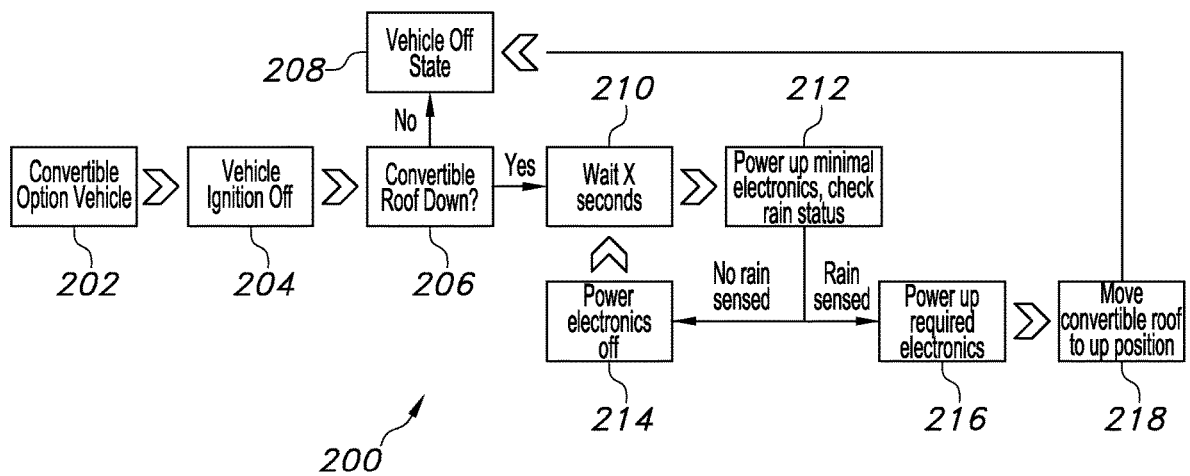
FIG. 2 is a flow chart of one embodiment of a convertible roof control method of the present invention.

FIG. 2 illustrates one embodiment of a convertible roof control method 200 of the present invention. In a first step 202, it is determined that vehicle 10 is equipped with a convertible roof control arrangement 14. Next, in step 204, vehicle ignition 24 is turned fully off. If there is an ignition key, the key may be removed from the vehicle, the driver may get out of the vehicle and lock the doors. Vehicle 10 may be in its state of lowest nonzero current draw and/or lowest nonzero power consumption. All accessories that are normally controllable by the human driver while the ignition is in an "accessories" position, such as the radio, navigation system, power windows, power seats, power mirrors, windshield wipers, display screens, etc., may be disabled (e.g., cannot be turned on by the driver and cannot be operated by the driver). Vehicle 10 may be in the state that it is typically in when parked overnight wherein battery power consumption is minimized, yet the ignition can be turned on, the vehicle's doors can be locked and unlocked, and the engine or main motor of vehicle 10 can be turned on with the turn of a key or the press of a pushbutton.

In a next step 206, roof position sensor 20 determines whether the convertible roof is down. If not (i.e., the roof is up, covering the passenger compartment), then operation proceeds to step 208 where vehicle 10 is placed in the OFF state and no further operation is required until vehicle ignition 24 is turned ON again. However, if in step 206 roof position sensor 20 determines that the convertible roof is down, then operation proceeds to step 210 where a timer is set and no action is taken aside from waiting for x number of seconds, wherein x is a number of seconds that may be set by the driver or during manufacture of vehicle 10.

After step 210, operation proceeds to step 212 where it is checked whether it is raining. Minimal electronics may be powered up, such as only rain sensor 16, and electronic processor 18, in order to perform step 212. If it is determined in step 212 that there is no rain, then operation proceeds to step 214 where some electronics may be shut down, such as rain sensor 16, in order to conserve energy in the vehicle's battery. Operation then returns to step 210. However, if it is determined in step 212 that it is raining, then operation proceeds to step 216 where all the electronics required to raise roof 11 (e.g., roof position sensor 20 and roof actuator 22) is powered up. Then, in step 218, convertible roof 11 is moved to the up position by roof actuator 22. Then, finally, operation proceeds to step 208 where vehicle 10 is placed in the OFF state and no further operation is required until vehicle ignition 24 is turned ON again.

In another embodiment, if the driver leaves the roof in the down position when he turns off the vehicle ignition, then the processor continues to monitor the rain sensor even after having moved the roof to the up position in response to detecting rain. Subsequently, if no rain is detected during some continuous time period (e.g., fifteen minutes), then the processor returns the roof to the down position.

There may be no need to check rain sensor 16 in step 212 very frequently. The more often rain sensor 16 is checked, the more parasitic current is drawn from the batttery. As an example, rain sensor 16 may be checked every 30 seconds, which may result in relatively little rain damage possibly being caused to the interior of vehicle 10. It is also possible within the scope of the invention to continually check rain sensor 16. However, continual checking may increase power consumption.

Figure 3:
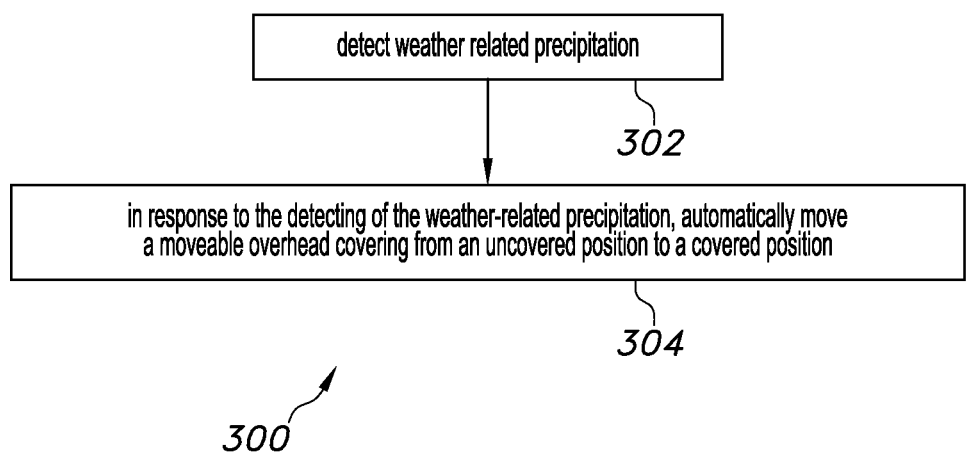
FIG. 3 is a flow chart of one embodiment of a method of the present invention for operating a movable overhead covering of a motor vehicle.

FIG. 3 illustrates one embodiment of a method 300 of the present invention for operating a movable overhead covering of a motor vehicle. In a first step 302, weather-related precipitation is detected. For example, a precipitation sensor, such as rain sensor 16, may detect rain, snow, sleet or hail.

In a final step 304, in response to the detecting of the weather-related precipitation, a moveable overhead covering is automatically moved from an uncovered position to a covered position. For example, in response to processor 18 receiving a rain signal from rain sensor 16, convertible roof 11 may be moved from the down position to the up position by roof actuator 22 under the control of processor 18.

In addition to rain sensors, it is possible for the vehicle to get weather information from a website and adjust the roof position based on that weather data.

In addition to rain, the vehicle may react to, and adjust the roof position based upon, other weather conditions, including but not limited to snow/sleet/hail/etc. Rain sensors and sensors for detecting snow/sleet/hail/etc. (weather-related precipitation) may all be referred to herein as "precipitation sensors".

In addition to the vehicle automatically adjusting the roof position, the vehicle may notify the owner of the rain, such as through a text message and/or phone call. In response to the rain notification, the owner could adjust the roof position via an app/key fob.

In addition to, or as an alternative to, a rain sensor, the vehicle may include a sensor which detects foreign objects falling inside or into the passenger compartment. The vehicle may adjust the roof position based on that foreign falling object information (e.g., leaves falling into the vehicle).

The invention may also be equally applied to vehicles with a sunroof rather than a convertible roof. The term "movable overhead covering" may be used herein to encompass both convertible roofs and sunroofs. A movable overhead covering may be movable between a "covered position" in which the convertible roof is up or the sunroof is closed (sheltering the passenger compartment from rain) and an "uncovered position" in which the convertible roof is down or the sunroof is open (allowing rain to enter the passenger compartment).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a movable overhead covering of a motor vehicle, the method comprising:
    detecting weather-related precipitation; and
    in response to the detecting of the weather-related precipitation, automatically moving the moveable overhead covering from an uncovered position to a covered position, wherein the detecting step is performed intermittently and repeatedly, with waiting time periods between performances of the detecting steps.

2. The method of claim 1 wherein the movable overhead covering comprises a convertible roof.

3. The method of claim 1 wherein the detecting is performed by a rain sensor.

4. The method of claim 1 wherein the detecting is performed while driver-controllable electronic accessories of the vehicle are disabled.

5. The method of claim 1 wherein the detecting is performed without any human being in the motor vehicle.

6. The method of claim 1 wherein the moving of the movable overhead covering is performed while driver-controllable electronic accessories of the vehicle are disabled.

7. The method of claim 1 wherein the moving of the movable overhead covering is performed without any human being in the motor vehicle.

\* \* \* \* \*